E. C. CARRICK.
CONTINUOUS SUGAR WASHING MACHINE.
APPLICATION FILED JAN. 19, 1920.
1,367,946.
Patented Feb. 8, 1921.
2 SHEETS—SHEET 1.
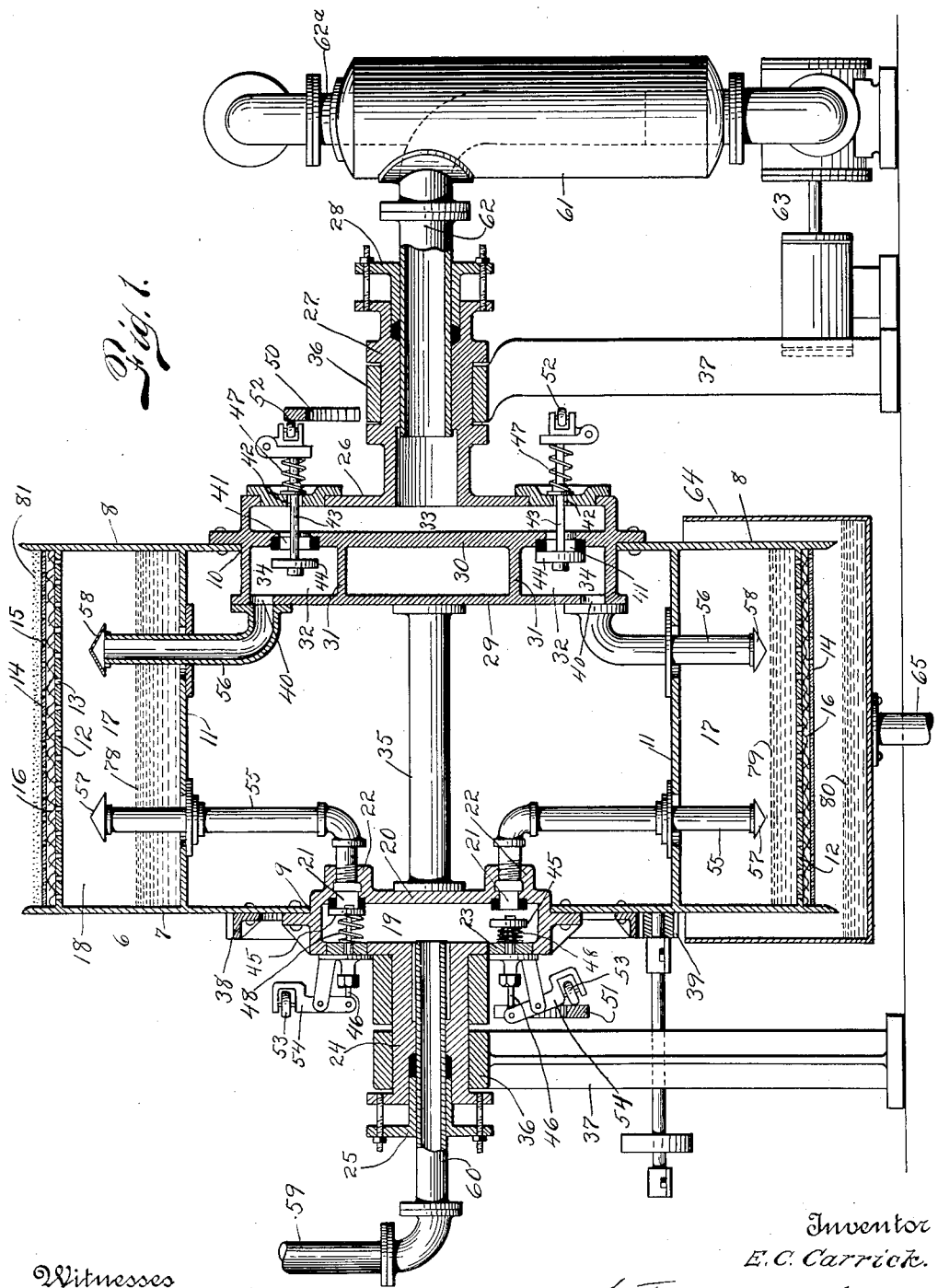
Witnesses
John B. Jade
Inventor
E. C. Carrick.
by Wilkinson & Ginsta
his Attorneys

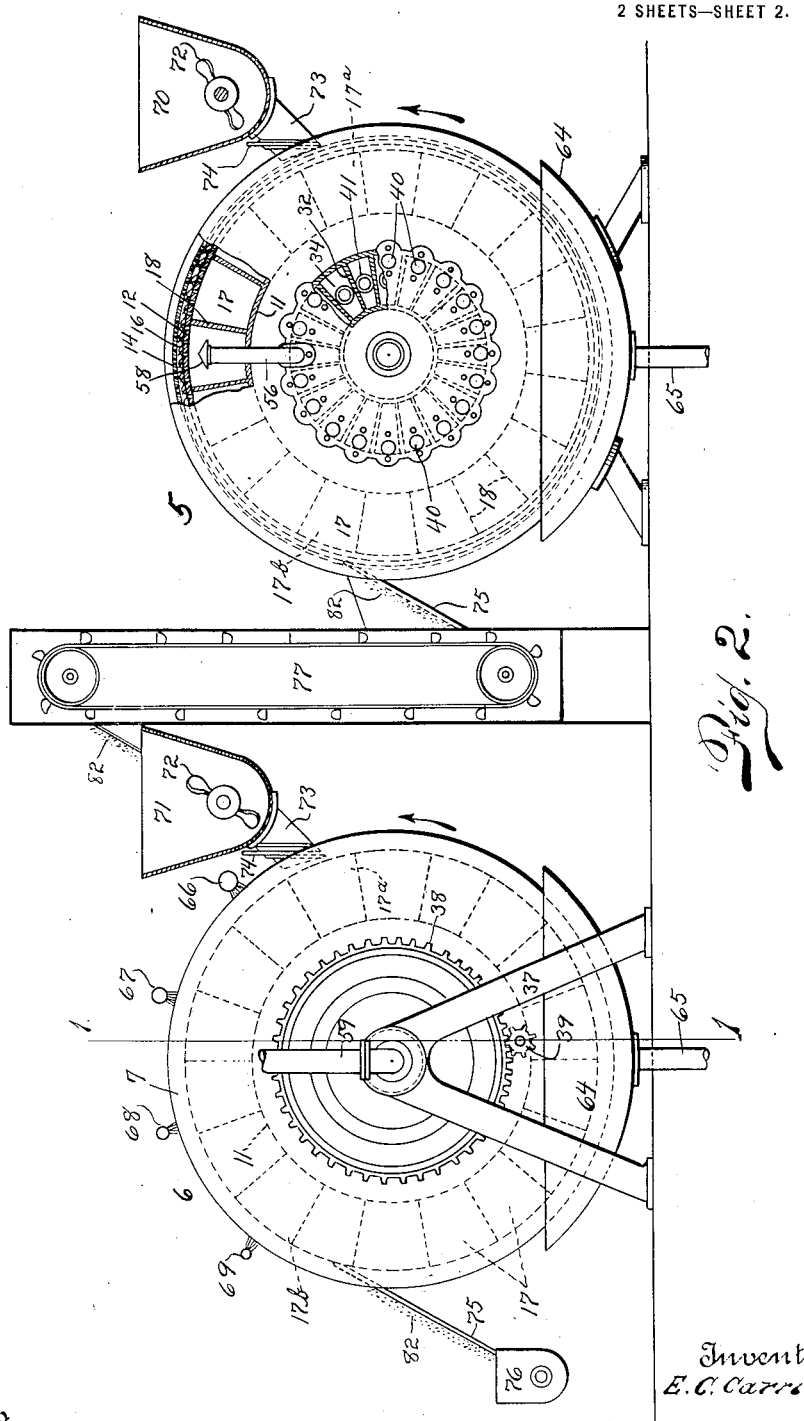

UNITED STATES PATENT OFFICE.

EVERETT C. CARRICK, OF SCOTTSBLUFF, NEBRASKA, ASSIGNOR OF ONE-HALF TO NELSON A. LOCKWOOD, OF OGDEN, UTAH.

CONTINUOUS SUGAR-WASHING MACHINE.

1,367,946.     Specification of Letters Patent.     Patented Feb. 8, 1921.

Application filed January 19, 1920. Serial No. 352,526.

*To all whom it may concern:*

Be it known that I, EVERETT C. CARRICK, a citizen of the United States, residing at Scottsbluff, in the county of Scotts Bluff, State of Nebraska, have invented certain new and useful Improvements in Continuous Sugar-Washing Machines; and I do hereby declare the following to be a full, clear, and exact description of the invention, such as will enable others skilled in the art to which it appertains to make and use the same.

This invention broadly relates to apparatus for recovering desired solids suspended in liquid or semi-liquid solutions or mixtures, but to specify one important field of its utility it may be said to have been primarily devised to embody an improved continuous sugar washing machine, and for simplicity of disclosure it may be most conveniently entitled and described as such.

It is to be distinctly understood and it is desirable to emphasize it at the outset, however, that the invention is not necessarily restricted to any such specific sphere, but that in some of its phases at least, and doubtless in all, the improvements may be equally susceptible for use in other analogous relations, or in other arts, and with more or less mobile liquid or semi-liquid masses other than saccharine juices.

Various objects and advantages will be so plainly apparent, as incidental to the following disclosure, that it would only be undesirable surplusage to enlarge upon the same initially, and with these prefacing remarks, therefore, and for a clearer conception of the gist of the invention as succinctly set forth in the appended claims, reference will immediately be had to the accompanying drawings illustrating a practical embodiment of the improvements, in which drawings—

Figure 1 is a centrally transverse vertical sectional view of a suitably supported revoluble drum and associated elements embodying a unit of my improvements, the section being taken substantially along the line 1—1 of Fig. 2 and with some parts shown in elevation; and Fig. 2 is a view, looking toward the right in Fig. 1, partly in side elevation and partly in section, with some parts broken away and other parts omitted for convenience of illustration, the view being primarily intended to simply show the association of a plurality of said drum units arranged in coöperative series.

5 and 6 generally designate my improved form of drums, which are adapted to be suitably supported to revolve in vertical planes, as hereinafter referred to, and which are shown disposed in tandem relation at Fig. 2, although in some uses one of said drums only need be employed and reversely more than two may be installed to meet required conditions.

These drums include end walls or heads 7 and 8 having enlarged axial apertures 9 and 10, an internal annular partitioning wall 11 and a foraminated outer or peripherally disposed wall which is preferably inset slightly from the peripheral edges of the end walls 7 and 8, to provide a peripheral channel or recess around the drum.

This outer foraminated wall is preferably made up sectionally of an annular wall 12, substantially spaced concentrically of the partitioning wall 11 and freely perforated with small orifices 13, an analogously perforated removable encircling band 14, preferably of comparatively thin brass or copper plate, 15 indicating the small orifices thereof which need not necessarily be in alined registration with the orifices 13, and an intermediate filtering band 16 of suitable material, a fine mesh wire netting being found very suitable.

The annular space between the walls 11 and 12 is provided with a circumferential series of independent compartments 17, closed to each other by radial separating webs 18, which compartments function dually as vacuum chambers and as liquid-expulsion pressure chambers while revolving through predetermined zones during their cycles of rotation.

The axial aperture 9, of the end wall 7, is closed by a suitably walled pressure fluid manifold compartment 19 including an inner wall 20, having a circumferential series of outlet ports 21 encompassed by attaching threaded nipples 22, and an outer wall embodying a corresponding series of opposed apertures to receive valve stem bearing seats or washers 23, the outer wall being also provided with an external hollow hub or trunnion 24, suitably formed at its outer end to coöperate with a gland or stuffing box element 25.

Analogously the axial aperture 10, of the opposite end wall 8 of the drum is closed by a manifold arrangement, but of a slightly different construction, which includes the outer wall 26, having a suitable hollow trunnion 27 and coöperating stuffing box 28, an inner wall 29, disposed substantially within the drum, and intermediate wall 30 directly abutting the aperture 10 and providing a closing disk therefor. An annular wall 31 extends between the inner and intermediate walls 29—30, and the encircling space thereof is divided off into a circumferential series of separate compartments spaced by the radial division walls or webs 32, the whole arrangement providing a main vacuum chamber 33 and auxiliary vacuum chambers or compartments 34, the latter corresponding in number to the peripheral compartments 17.

A spacing rod 35 extends between the inner walls of the pressure fluid manifold and the vacuum manifold, and the hollow trunnions 24—27 are suitably journaled in bearings or boxes 36 mounted on standards 37, while the drums are shown as being rotatable by an external gear element 38 meshing with a driving pinion wheel 39. It is obvious, however, that a worm gear drive or any other suitable revolving means may be employed.

The inner wall 29 of the vacuum manifold has a circumferential series of inlet ports 40, one for each auxiliary vacuum chamber 34, and likewise each chamber 34 has a complementary valve-controlled outlet port 41, through the intermediate wall 30, communicating in circumferential series between the auxiliary vacuum chambers 34 and the main vacuum chamber 33, which latter is in open communication with the hollow trunnion 27. The outer wall 26 is also provided with a complementary series of bearing apertures 42 for mounting the reciprocating stems 43 of valve parts 44 coöperating with the ports 41. In an analogous manner the outlet ports 21, of the pressure fluid manifold, are controlled by valve parts 45 carried by the inner ends of reciprocating stems 46, suitable coöperating retractile springs 47 and 48 being associated with said respective sets of valve elements. The actual details of these valve elements, however, are not consequential and may obviously be altered as desired by the substitution of equivalent means, provided that they are suitably controlled for actuation at proper predetermined intervals.

Such valve actuating means are broadly illustrated by a pair of sector or quadrant elements 50 and 51, one of which is diametrically disposed relatively to the other at opposite ends of each drum, and these quadrants are suitably shaped to provide cam surfaces successively wiped by the projecting ends of the valve stems 43—46, or preferably and more accurately speaking by anti-friction parts carried thereby. In one instance, these anti-friction parts may comprise rollers 52, hingedly carried by the valve stems 43, for rolling engagement with the cam face of the sector 50, to push the valves 44 open, against the tension of their retractile elements 47, while in the other instance they may comprise similarly functioning rollers 53 carried by the free ends of short levers 54, intermediately pivoted to a fulcruming arm, the other ends of which levers are connected to the valve stems 46 to pull the valves 45 open, against the tension of their retractile springs 48. All of these features will be clearly apparent, sufficiently for illustrative purposes, and the details thereof may obviously be altered in actual practice.

A pressure fluid conduit leads from each compartment 17 to the pressure fluid manifold chamber 19 and a suction conduit also leads from each compartment 17 to a complementary one of the auxiliary vacuum chambers 34, and these conduits are respectively indicated by the short elbow-pipes 55 and 56, and it is to be particularly noted that they terminate at their outer ends substantially intermediate of the annular walls 11 and 12, communicating with the interior of the compartments 17 through open ends hooded by cowls 57—58, or their equivalent, for purposes hereinafter referred to. In Fig. 1 two different methods are shown for coupling the inner ends of the pipes 55—56 with the port openings 21—40, and it is obvious that this is an expedient which may be accomplished in any other approved way.

The manifold chamber 19 is in open communication with a suitable source of steam, or other pressure fluid supply, by way of the pipe line 59 and hollow inlet connection 60, extending through the hollow trunnion 24 and around which the latter turns. The main vacuum chamber 33 is also in open communication with an air exhausting tank 61 by way of a curved pipe fitting 62, the horizontal arm of which projects within the hollow trunnion 27, and around which the latter turns, while its vertical arm is disposed within said exhausting tank, which latter is operatively connected with a suitable vacuum pump designated at 63. All of this is simply shown conventionally, as it is obvious that other specific means may be employed for maintaining a substantial vacuum in the main chamber 33, and one exhausting tank 61 will suffice for the several drums of a series by the employment of suitable branch connections, corresponding in function to the connection 62 and conventionally indicated at 62ª.

64 designates suitably supported segmental syrup pans for receiving the liquid discharge from the drums, from which pans the syrups and final weakened wash waters are run off to storage tanks, or otherwise, by way of piping 65.

At the left hand side of Fig. 2, 66 designates a wash syrup spray pipe and 67 and 68 indicate wash water spray pipes, while 69 is a spray pipe for steam under low pressure. All of these extend transversely of the periphery of the drum and are fed from any suitable supply sources. While these spray pipes do not appear in Fig. 1, and are omitted from the right hand side of Fig. 2, it will be understood that the several drums of the series are substantially duplicates of each other, and the first drum 5 of the series may be equipped with these spraying pipes the same as the succeeding drums 6.

Each of the drums is provided with a hopper or receiving receptacle 70—71, for the sugar juices or the like, having the usual mixing blades or agitators 72 with a valve controlled discharge chute 73, and the controlling means shown in the drawings comprises a gate valve 74. These discharge chutes are peripherally disposed just above the central horizontal planes of the drums, and at the opposite faces of the drums are located removing means, for the veneer of sugar or other solids, which may consist of diverting blades 75 having gouging or lifting edges extending across the metallic rim 14 in scraping engagement therewith.

76 conventionally designates a conveyer, receiving the discharge of sugar from the last scraper of the series from whence the sugar is conducted to the granulator, and 77 indicates an elevator located between adjacent drums for receiving the sugar discharge from the scraper of a preceding drum and conducting it to the feed hopper 71 of the next succeeding drum; but obviously this may be accomplished by other forms of elevating means, such as magma pumps for instance, or even one drum may be mounted above the other so as to discharge its sugar to the receiving hopper of the next drum.

78 simply designates the position of the liquid, purged from the solid contents of the solution of mixture being treated, in the compartments 17 during the latter's passage around its vacuum withdrawing zone, and 79 indicates the position of the same liquid in the compartments 17 as it travels around its pressure fluid expulsion zone, while 80 indicates said liquid as blown out from the drums into the syrup collector pans 64. Also in Fig. 1, 81 indicates the veneering layer of solids formed around the upper periphery of the drums as the liquid contents are purged therefrom, and in Fig. 2, 82 indicates the discharge of said solids as scraped off of the drums and conveyed therefrom for further treatment by another drum or otherwise.

Operation.

Assuming that the apparatus is being employed in the sugar industry, then the sugar solution or juices to be washed, whether from beet-root or cane production, are fed into the first hopper 70 and discharged through its chute 73 on to the perforated covering sheet 14 of an associated drum, the density or thickness of the viscous layer deposited thereon being governed by the adjustment of the gate valve 74 regulating the flow.

From substantially the position of the drum receiving the deposit of the viscous juices to substantially the position where the solid contents are taken off, the peripheral compartments 17 are caused to function as independent vacuum chambers by being successively brought into open communication with the vacuum manifold. During this period of the drum's rotary cycle, which may properly be said to be the period of travel around the vacuum separation zone, the layer of deposited juices may be successively sprayed by a syrup wash, one or more water washes and steam under low pressure, as previously referred to and for purposes well understood in the industry. During another period of the drum's rotary cycle, predetermined by the circumferential dimension of its partially encompassing segmental syrup pan 64, which may be referred to as the period of travel around the purged liquid expulsion zone, the compartments 17 are successively brought into open communication with the pressure fluid manifold and are caused to then function as liquid-expulsion pressure chambers for the dual purpose of both blowing the extracted liquid, through the peripheral strainer wall, into the syrup pan and also thus removing any clogging sugar contents from the pores of said filtering or strainer wall preparatory to a subsequent deposit of the viscous juices thereon. These operations are accomplished automatically through the medium of the series of puppet valves and co-acting elements, the positive actuating parts of which valves wipe over the cam faces of the respective sector elements 50—51, in such timed relation that when the compartments 17 are in communication with the vacuum manifold they are closed to the pressure fluid manifold and vice versa, as follows:—

As each puppet valve 44 arrives at a position opposed to the entrant end of the sector 50, which position corresponds substantially to the position 17ª (Fig. 2) of the drum, its contact wheel 52 starts to ride along the cam face thereof, pushing open that particular valve (as seen at the upper portion of Fig. 1) and maintaining same open while traveling over said cam face. During this open period, communication is accordingly maintained indirectly between the main vacuum chamber 33 and the peripheral vacuum compartment 17, controlled by that valve, by way of one of the connecting pipes 56, a complementary auxiliary vacuum chamber 34 and its port 41, thus sucking the air out of that compartment 17 for maintaining a substantial vacuum therein, it being observed that during this interval the pressure fluid puppet valve 45 for that compartment is held closed.

A substantial vacuum being thus established in each compartment 17, from approximately its position at 17ª to 17ᵇ, it follows that the pressure therein is considerably less than the atmospheric pressure outside and hence the liquid of the viscous juices, on the strainer wall, is caused to be purged from the solid contents and falls within the compartment. However, it is to be noted that, owing to the pipe 56 being projected substantially within the compartment so as to extend above the level 78 of the liquid therein and the open upper end of the pipe being hooded, the purging force on the strainer wall is uniformly distributed and exerted over its entire filtering area and furthermore, no liquid is drawn into the pipe 56 at all, as contradistinguished from a vacuum extraction structure employing a plurality of suction tubes, directly associated with a filtering belt or the like, whereby they suck not only the liquid through the pores of the strainer element and through the tubes, which latter tend to become quickly clogged by the sticky substance, but they also additionally suck along a substantial volume of the solid contents owing to the directly positive action of the forceful suction nozzles, features which are manifestly very objectionable.

At approximately the position 17ᵇ, the vacuum is gradually relieved on each compartment 17 as the contact roller 52, of its valve control, rides off of the sector 50 and the valve 44 is closed by its retractile element 47, whereupon the scraper element 75, or equivalent means, removes the veneer of sugar solids from the peripheral strainer wall as will be obvious.

The pressure fluid controlling puppet valves 45 are also successively actuated, in substantially the same manner as the valves 44, by their contact rollers 53 riding over the cam face of the sector 51 as before described, and while the opening of each of these valves 45 may be timed slightly in advance of the zone of the syrup pan 64, still the full force of the pressure fluid, passing through the hooded pipes 55 to fill the compartments 17 which now become liquid expulsion pressure compartments, is not accrued in each compartment until it comes opposite to the entrant end of the syrup pan, whereupon the liquid, which has now assumed a level 79 on the inside face of the strainer wall, is blown therethrough into the pan by a uniform outward radial pressure. By the time that the compartment has reached the exit end of the syrup pan all of its liquid has been expelled, and the valves 45 being closed by their springs 48, as the rollers pass off of the sector 51, the pressure in the compartments 17 is obviously relieved before the compartments arrive again at the vacuum zone.

Each puppet valve 44 and 45 being thus actuated, it follows that the compartments 17 are accordingly opened and closed to the vacuum and the pressure fluid manifolds in proper sequential order, thereby insuring a continuous and automatic cycle of operations, and the conveyance of the separated solids for treatment with a series of associated drums will be fully apparent from the foregoing description and reference to Fig. 2 of the drawings.

While I have thus made a complete disclosure of a practical embodiment of my improvements, it may later be found to be desirable or expedient to make minor alterations or substitutions in the form and structural arrangement of elements, but without departing from the spirit of the invention, and it will be understood, therefore, that I do not limit myself necessarily to the exact details shown and described, excepting as they may come within the purview of the ensuing claims, when fairly interpreted in the light of the specification and understood equivalents.

What I do claim, as new and patentable, is:—

1. The combination of an endless element providing an uninterrupted peripheral filtering wall, for receiving wet deposits on its outer surface, and a series of compartments open thereto; driving means therefor; means for maintaining a substantial vacuum in each of said compartments during one zone of travel; pressure fluid means for expelling through the pores of said wall, during a subsequent zone of travel, the filtrate liquid accumulating in said compartments; and means for removing solid deposits from the outer face of said wall, after leaving the vacuum zone and before entering the filtrate expelling zone, substantially as described.

2. The combination of an endless element providing an uninterrupted peripheral filtering wall, for receiving wet deposits on its outer surface, and a series of compartments open thereto; driving means therefor; a vacuum manifold; a pressure fluid manifold; a conduit under automatic control leading from each of said manifolds to each of said compartments; which elements respectively function to maintain a substantial vacuum in said compartments during one zone of travel and to expel through the pores of said wall, during a subsequent zone of travel, the filtrate liquid accumulating in said compartments; and means for removing solid deposits from the outer face of said wall, after leaving the vacuum zone and before entering the filtrate expelling zone, substantially as described.

3. The combination of an endless element providing an uninterrupted peripheral filtering wall, for receiving wet deposits on its outer surface, and a series of compartments open thereto; driving means therefor; a vacuum establishing source; a pressure fluid source; a conduit under automatic control leading from each of said sources to each of said compartments, and terminating therein with open ends disposed in protected spaced relation to said peripheral wall, which elements respectively function in sets to maintain a substantial vacuum in said compartments during one zone of travel and to expel through the pores of said wall, during a subsequent zone of travel, the filtrate liquid accumulating in said compartments; and means for removing solid deposits from the outer face of said wall, after leaving the vacuum zone and before entering the filtrate expelling zone, substantially as described.

4. The combination of an endless element providing an uninterrupted peripheral filtering wall, for receiving wet deposits on its outer face, and a series of compartments open thereto; driving means therefor; a vacuum establishing source; a pressure fluid source; a conduit under automatic control leading from each of said sources to each of said compartments, and projecting into the latter with hooded open ends terminating at positions substantially spaced from the encompassing walls thereof, which elements respectively function in sets to maintain a substantial vacuum in said compartments during one zone of travel and to expel through the pores of said peripheral wall, during a subsequent zone of travel, the filtrate liquid accumulating in said compartments; and means for removing solid deposits from the outer face of said peripheral wall, after leaving the vacuum zone and before entering the filtrate expelling zone, substantially as described.

5. The combination of a drum providing an uninterrupted peripheral filtering wall, for receiving wet deposits on its outer surface, and a series of compartments open thereto; rotating means therefor; means for maintaining a substantial vacuum in each of said compartments during one zone of travel; pressure fluid means for expelling through the pores of said wall, during a subsequent zone of travel, the filtrate liquid accumulating in said compartments; and means for removing solid deposits from the outer face of said wall, immediately after leaving the vacuum zone and before entering the filtrate expelling zone, substantially as described.

6. The combination of a drum having a peripheral filtering wall and an internally spaced annular wall with partitioning walls therebetween to provide a circular series of liquid holding compartments open to said filtering wall; rotating means therefor; a vacuum establishing source; a pressure fluid source; a conduit under automatic control leading from each of said sources to each of said compartments and opening to the latter at positions substantially distant from said internal annular wall, which elements respectively function in sets to successively maintain a substantial vacuum in said compartments during one zone of travel and to expel through the pores of said peripheral wall, during a subsequent zone of travel, the filtrate liquid accumulating in said compartments; and means for removing solid deposits from the outer face of said peripheral wall, after leaving the vacuum zone and before entering the filtrate expelling zone, substantially as described.

7. The combination of a drum having a peripheral filtering wall and an internally spaced annular wall with partitioning walls therebetween to provide a circular series of liquid holding compartments open to said filtering wall; rotating means therefor; a vacuum establishing source; a pressure fluid source; an independent conduit under automatic control leading from each of said sources to each of said compartments and opening to the latter at positions substantially spaced from all of the encompassing walls thereof, which elements function respectively to maintain a substantial vacuum in said compartments during one zone of travel and to expel through the pores of said filtering wall, during a subsequent zone of travel, the filtrate liquid accumulating in said compartments; and means for removing solid deposits from the outer face of said filtering wall, after leaving the vacuum zone and before entering the filtrate expelling zone, substantially as described.

8. The combination of a drum having a peripheral filtering wall and an internally spaced annular wall with partitioning walls therebetween to provide a circular series of liquid holding compartments open to said filtering wall; rotating means therefor; a vacuum establishing source; a pressure fluid source; an independent conduit under automatic control leading from each of said sources to each of said compartments and opening to the latter with shielded ends at positions substantially distant from said internal annular wall, which elements function respectively to maintain a uniformly exerted vacuum force throughout said compartments during one zone of travel and a uniformly expansive pressure force for expelling through the pores of said filtering wall, during a subsequent zone of travel, the filtrate liquid accumulating in said compartments; and means for removing solid deposits from the outer face of said filtering wall, after leaving the vacuum zone and before entering the filtrate expelling zone, substantially as described.

9. The combination of a drum having a peripheral filtering wall and an internally spaced annular wall with partitioning walls therebetween to provide a circular series of liquid holding compartments open to said filtering wall; rotating means therefor; a vacuum establishing source; a pressure fluid source; independent conduits under automatic control leading from each of said sources, through said internal annular wall, and terminating in hooded open ends within each of said compartments at positions spaced from the encompassing walls thereof, the several elements respectively functioning to maintain a substantial vacuum in said compartments during one zone of travel and to expel through the pores of said filtering wall, during a subsequent zone of travel, the filtrate liquid accumulating in said compartments; and means for removing solid deposits from the outer face of said filtering wall, after leaving the vacuum zone and before entering the filtrate expelling zone, substantially as described.

10. The combination of a drum providing an uninterrupted peripheral filtering wall, for receiving wet deposits on its outer surface, and a circular series of liquid holding compartments open thereto; rotating means therefor; a vacuum manifold and a pressure fluid manifold revolubly associated with said drum, and the said vacuum manifold embodying a main chamber and a series of auxiliary chambers equal numerically to said compartments; independent conduits leading from said pressure fluid manifold and from each of said auxiliary vacuum chambers to each of said compartments; automatic means serially controlling said conduits, for maintaining a substantial vacuum in said compartments during one zone of travel and expelling through the pores of said filtering wall, during a subsequent zone of travel, the filtrate liquid accumulating in said compartments; and an external scraper element coöperating with said uninterrupted filtering wall at a position between the exit end of said vacuum zone and the entrant end of the filtrate expelling zone, substantially as described.

11. The combination of a drum providing an uninterrupted peripheral filtering wall, for the external reception of wet deposits, and liquid holding compartments open thereto; rotating means therefor; a vacuum manifold and a pressure fluid manifold; conduits leading from said manifolds to each of said compartments and terminating in spaced relation to the encompassing walls thereof; ports and puppet valves for said conduits, the stem of each valve having a wiping contact; diametrically opposed cam sectors engaged by the latter at proper intervals to establish a substantial vacuum in said compartments during their upper zone of travel and to expel through the pores of said filtering wall, during the subsequent lower zone of travel, the filtrate liquid accumulating in said compartments; and an external scraper element coöperating with said uninterrupted filtering wall at a position between the exit end of the vacuum zone and the entrant end of the filtrate expelling zone, substantially as described.

12. The combination of a drum providing an uninterrupted peripheral filtering wall and serial liquid holding compartments open thereto; rotating means therefor; means automatically controlled for successively establishing a substantial vacuum throughout each of said compartments during their zone of travel extending around the upper portion of the drum; means for feeding wet deposits to the outer peripheral surface of said filtering wall approximately at its entrance into said upper vacuum zone; means for suitably spraying said peripheral deposits; a catch pan encompassing the lower portion of said drum; means automatically controlled for delivering pressure fluid within each of said compartments during their zone of travel extending around the lower portion of said drum while traversing said catch pan for expelling through the pores of said filtering wall the filtrate liquid accumulating in said compartments; and an external scraper element associated with said drum between the exit end of the vacuum zone and the entrant end of the filtrate expelling zone, substantially as described.

In testimony whereof I affix my signature.

EVERETT C. CARRICK.